United States Patent [19]
Park

[11] Patent Number: 5,798,956
[45] Date of Patent: Aug. 25, 1998

[54] PARALLEL MULTIPLIER

[75] Inventor: Soung Hwi Park, Kyungsangbook-Do, Rep. of Korea

[73] Assignee: LG Semicon Co., Ltd., Cheongju, Rep. of Korea

[21] Appl. No.: 526,191

[22] Filed: Sep. 11, 1995

[30] Foreign Application Priority Data

Oct. 9, 1994 [KR] Rep. of Korea .................. 1994/22847

[51] Int. Cl.[6] ........................................................ G06F 7/52
[52] U.S. Cl. ........................................................ 364/758
[58] Field of Search ..................................... 364/758, 759, 364/760, 757

[56] References Cited

U.S. PATENT DOCUMENTS

| | | | |
|---|---|---|---|
| 3,346,729 | 10/1967 | Dell et al. ................... | 364/758 |
| 3,506,817 | 4/1970 | Winder ...................... | 364/758 |
| 3,691,359 | 9/1972 | Dell et al. ................... | 364/758 |
| 3,900,724 | 8/1975 | McIver ...................... | 364/758 |
| 3,914,589 | 10/1975 | Gaskill, Jr. et al. ........... | 364/758 |
| 3,950,636 | 4/1976 | Dao ........................ | 364/758 |
| 4,369,500 | 1/1983 | Fette ....................... | 364/758 |

*Primary Examiner*—David H. Malzahn
*Attorney, Agent, or Firm*—Fleshner & Kim

[57] ABSTRACT

An improved parallel multiplier capable of operating an addition operation by connecting a plurality of dividers sequentially, thus providing more simple circuit and reducing operating time thereof, which includes NXM AND-gates each for ANDing each multiplier bit ranging from a least significant bit to a most significant bit with each multiplicand bit in case of multiplying "N" multiplicand bits and "M" multiplier bits and for performing a partial multiplication and for outputting a least significant bit as a result of the multiplication; and a plurality of input-bits dividers, having 2-, 3-, and 4-input-bits dividers, for receiving an output bit of a corresponding location among a rearranged output bit and a quotient bit outputted from a proceeding input bit in case that the output bits of the AND-gates is shifted to the left by a bit in accordance with a conventional binary multiplication method and for outputting a quotient bit and a remaining bit corresponding to each bit of a multiplication result.

19 Claims, 13 Drawing Sheets

| INPUT | | | OUTPUT | |
|---|---|---|---|---|
| C | B | A | Co | S |
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |

| THE NUMBER OF "1" IN 7 INPUT BITS | $2^{n+2}$ | $2^{n+1}$ | $2^n$ |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

4 INPUT BITS DIDIDER

| INPUT | | | | OUTPUT | | |
|---|---|---|---|---|---|---|
| A | B | C | D | S2 | S1 | R |
| 0 | 0 | 0 | 0 | 0 | 0 | 0 |
| 0 | 0 | 0 | 1 | 0 | 0 | 1 |
| 0 | 0 | 1 | 0 | 0 | 0 | 1 |
| 0 | 0 | 1 | 1 | 0 | 1 | 0 |
| 0 | 1 | 0 | 0 | 0 | 0 | 1 |
| 0 | 1 | 0 | 1 | 0 | 1 | 0 |
| 0 | 1 | 1 | 0 | 0 | 1 | 0 |
| 0 | 1 | 1 | 1 | 0 | 1 | 1 |
| 1 | 0 | 0 | 0 | 0 | 0 | 1 |
| 1 | 0 | 0 | 1 | 0 | 1 | 0 |
| 1 | 0 | 1 | 0 | 0 | 1 | 0 |
| 1 | 0 | 1 | 1 | 0 | 1 | 1 |
| 1 | 1 | 0 | 0 | 0 | 1 | 0 |
| 1 | 1 | 0 | 1 | 0 | 1 | 1 |
| 1 | 1 | 1 | 0 | 0 | 1 | 1 |
| 1 | 1 | 1 | 1 | 1 | 1 | 0 |

FIG.6C

| THE NUMBER OF "1" IN INPUT BITS | THE NUMBER OF "1" IN OUTPUT BITS S1 AND S2 | OUTPUT BIT R |
|---|---|---|
| 0 | 0 | 0 |
| 1 | 0 | 1 |
| 2 | 1 | 0 |
| 3 | 1 | 1 |
| 4 | 2 | 0 |

PARALLEL MULTIPLIER

BACKGROUND OF THE INVENTION

1. Field of the Invention

The present invention relates to a parallel multiplier, and particularly to an improved parallel multiplier capable of operating an addition operation by connecting a plurality of dividers sequentially, thus providing more simple circuit and reducing operating time thereof.

2. Description of the Conventional Art

Generally, in case of multiplying the multiplicand bits and multiplier bits which are expressed in a binary form, a partial multiplication of the multiplicand bits and multiplier bits is performed, and the partial multiplication is shifted to the left by a bit, and the shifted partial multiplication is performed. Therefore, the speed of such multiplication operation depends on the speed of an addition operation. The procedure of such partial multiplication can be expressed as follows with an example of binary $1010_2(10_{10})$ and $1110_2$ ($14_{10}$).

```
              1010₂ <--- multiplicand bits (10₁₀)
         X    1110₂ <--- multiplier bits (14₁₀)
         ----------------------------------------
         0000₂ <---- 2⁰ bit of multiplier is "0" ----- a partial multiplication 1
         1010₂ <---- 2¹ bit of multiplier is "0" ----- a partial multiplication 2
         1010₂ <---- 2² bit of multiplier is "0" ----- a partial multiplication 3
         1010₂ <---- 2³ bit of multiplier is "0" ----- a partial multiplication 4
         ----------------------------------------
              10001100₂ <--- result(140₁₀)
```

According to the above-described procedure of the multiplication, a parallel multiplier differs from a serial multiplier. The serial multiplier includes an adder capable of storing n-bits with respect to each digit ($2^0, 2^1, \ldots, 2^n$) of a multiplier and registers for storing a partial sum so as to perform an addition operation sequentially.

Such as a serial multiplier is relatively simple in its construction and requires a clock pulse in each operation step and has lengthy operation time, so that it is not used for an operation apparatus which requires a high speed operation.

Meanwhile, the parallel multiplier uses an addition operation apparatus having a plurality of n-bit with respect to each digit($2^1, \ldots, 2^n$) of a multiplication so as to perform a multiplication operation, so that since it has a high speed performance, it is available for a high speed apparatus.

Figure 1:
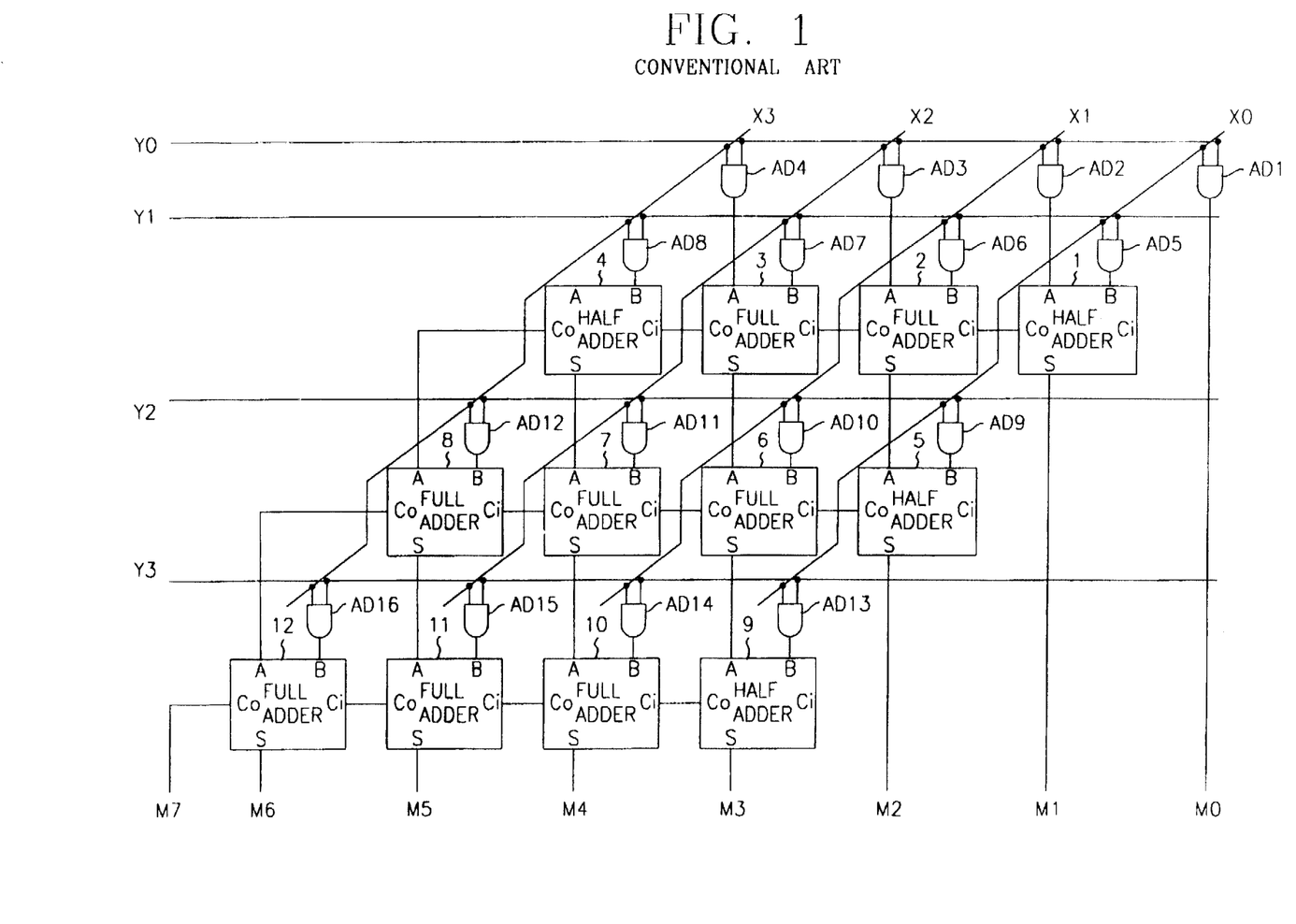
FIG. 1 is a circuit diagram of a conventional parallel multiplier.

Referring to FIG. 1, a conventional parallel multiplier, in case that multiplicand bits X0 through X3 and multiplier bits Y0 through Y3 are 4 bits, respectively, includes AND-gates AD1 through AD4 for ANDing a bit Y0 and its corresponding bits X0 through X3, AND-gates AD5 through AD8 for ANDing a bit Y1 and its corresponding bits X0 through X3, a half adder 1 for adding output bits of AND-gates AD2 and AD5, a full adder 2 for adding a carry bit C0 outputted from a half adder 1 and output bits of AND-gates AD3 and AD6, a full adder 3 for adding a carry bit C0 outputted from a full adder 2 and output bits of AND-gates AD4 and AD7, a half adder 4 for adding a carry bit C0 outputted from a full adder 3 and output bits of the AND-gate AD8, AND-gates AD9 through AD12 for ANDing a bit Y2 and its corresponding bits X0 through X3, a half adder 5 for adding a sum bit S outputted from the full adder 2 and the output bits outputted from the AND-gate AD9, a full adder 6 for adding the carry bit C0 outputted from the half adder 5, the sum bit S outputted from the full adder 3, and the output bits of an AND-gate AD10, a full adder 7 for adding the sum bit S outputted from the half adder 4 and the output bit of an AND-gate AD11, a full adder 8 for adding the carry bit C0 outputted from the full adder 7, the carry bit C0 outputted from the half adder 4, and the output bit of the AND-gate AD12, AND-gates AD13 through AD16 for ANDing a bit Y3 and its corresponding bits X0 through X3, a half adder 9 for adding the sum bit S outputted from the full adder 6 and the output bit of an AND-gate AD13, a full adder 10 for adding the carry bit C0 outputted from the half adder 9, the sum bit outputted from the full adder 7, and the output bits outputted from an AND-gate AD14, a full adder 11 for adding the carry bit C0 outputted from the full adder 10, the sum bit S outputted from the full adder 8, and the output bits of an AND-gate AD15, and a full adder 12 for adding the carry bit C0 outputted from the full adder 11, the carry bit C0 outputted from the full adder 8, and the output bits of an AND-gate Ad16.

Figure 2A:
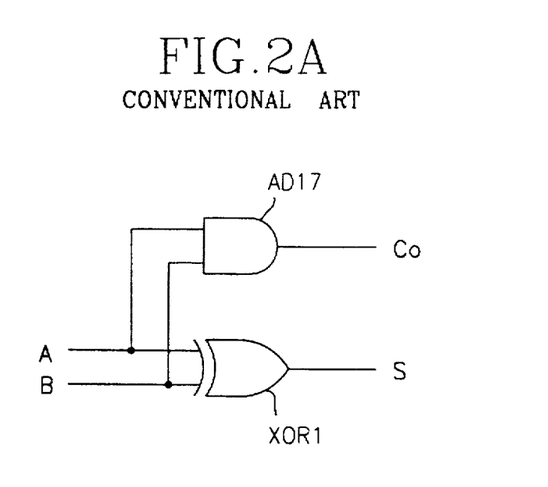
FIG. 2A is a circuit diagram of a half adder of FIG. 1.

As shown in FIG. 2A, each of the half adders 1, 4, 5, and 9 includes an AND-gate AD17 for ANDing the input bits A and B and for outputting the carry bit C0, and an exclusive OR-gate XOR1 for exclusively ORing the input bits A and B and for outputting the sum bits S.

Figure 2B:
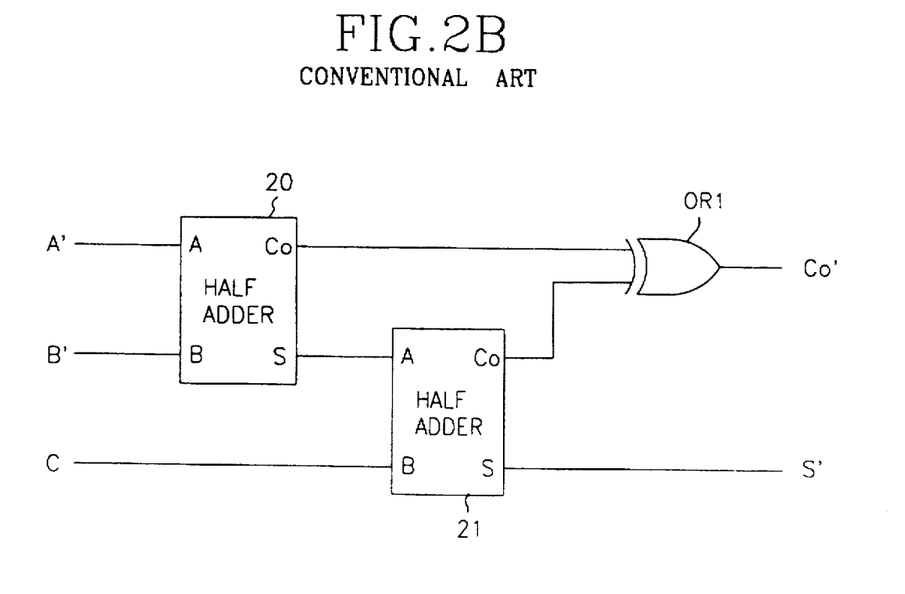
FIG. 2B is a circuit diagram of a full adder of FIG. 1.

In addition, as shown in FIG. 2B, the full adders 2, 3, 6, 8, 10, 11, and 12 each include a half adder 20 for adding input bits A' and B', a half adder 21 for adding the sum bits S outputted from the half adder 20 and the carry bits Ci and for outputting the sum bits S', and an OR-gate OR1 for ORing the carry bit Co outputted from the half adder 21 and the carry bits 20 outputted from the half adder 20.

The operation of the conventional parallel multiplier will now be explained with reference to FIGS. 1 and 2.

To begin with, the bit M0 outputted from the AND-gate AD1 becomes a least significant bit (LSB). Thereafter, the half adder 1 adds the out bits of the AND-gates AD2 and AD5 and outputs bits M1. In addition, the full adder 2 adds the out bits of the AND-gates AD3 and AD6 and the carry bits C0 outputted from the half adder 1, and the half adder 5 adds the sum bits S outputted from the full adder 2 and the AND-gate AD9 and outputs bits M2. In addition, the full adder 3 adds the output bits of the AND-gates AD4 and AD7 and the carry bit C0 outputted from the full adder 2, and the full adder 6 adds the sum bits S outputted from the full adder 3, the output bits of the AND-gate AD10 and the carry bits C0 outputted from the half adder 5. The half adder 9 adds the sum bits S outputted from the full adder 6 and the out bits of the AND-gate AD13 and outputs bits M13. The half adder 4 adds the carry bit C0 outputted from the full adder 3 and the output bits of the AND-gate AD8, and the full adder 7 adds the sum bits S outputted from the half adder 4, the output bits of the AND-gate AD11, and the carry bits C0 outputted from the fun adder 6, and the full adder 10 adds the sum bit S outputted from the full adder 7, the output bits of the AND-gate Ad14 and the carry bits C0 outputted from the half adder 9 and outputs bits M4. In addition, the full adder 8 adds the carry bits C0 outputted from the half adder 4, the output bits of the AND-gate AD12, and the carry bits C0 outputted from the full adder 7, and the full adder 11 adds the sum bits S outputted from the full adder 8, the output bits of the AND-gate AD15, and the carry bits C0 outputted from the full adder 10, and outputs bits M5. The full adder 12 adds the carry bits C0 outputted from the full adder 8, the output bits of the AND-gate AD16, and the carry bits C0 outputted from the full adder 11 and outputs bits M6. At this time, the carry bits C0 outputted from the full adder 12 become bits M7 of a most significant bit (MSB).

The above-described parallel multiplier performs an multiplication operation in parallel not using registers for storing the results of a partial multiplication and a partial addition, so that a parallel multiplier has more speedy operation compared with a serial multiplier.

However, since the speed of partial addition is very slow, the operation speed is generally subject to the adders rather than the time required for the operation of the partial multiplication by the AND-gate. In case that the multiplier bits and multiplicand bits include "n" bits, the required number of the transistor is in proportion to $n^2$, so that the manufacturing cost increases.

Meanwhile, there have been many studies is reducing the time required in addition operations. Among the parallel multipliers, a parallel multiplier using a wallace tree is the most speedy operation apparatus, and a modified wallace tree is generally used for the parallel multiplier.

Figure 3A:
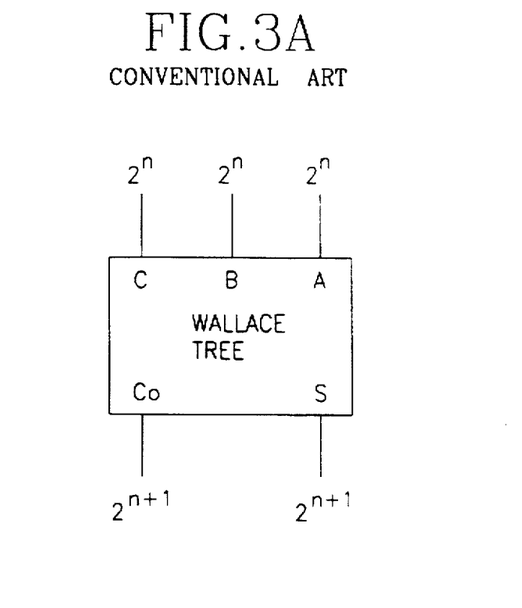
FIG. 3A is a block diagram of a wallace tree having a 3 input bits of a conventional parallel multiplier.
Figure 3B:
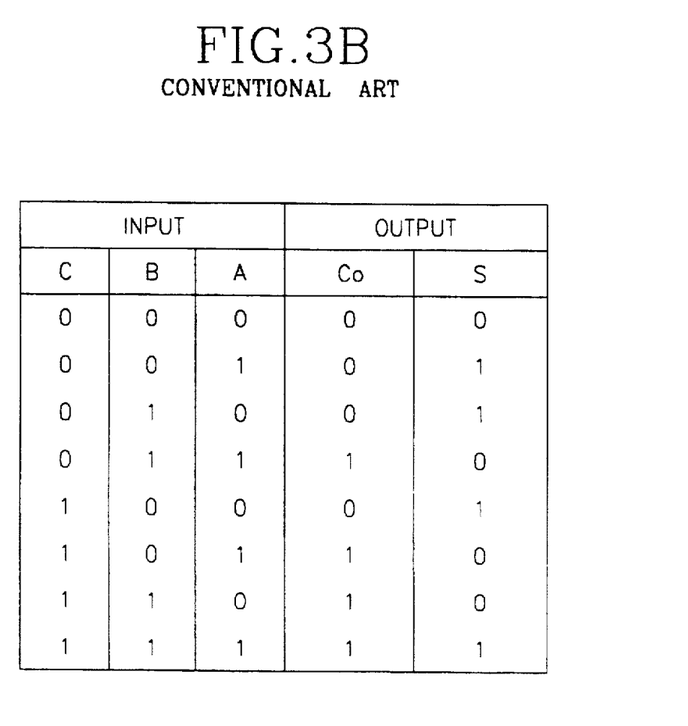
FIG. 3B is a truth table of a wallace tree including 3 input bits in a conventional parallel multiplier.

Here, the wallace tree, as shown in FIG. 3, receives bits A, B, and Ci each of $2^n$ digit in case of having 3-bit input and outputs a sum bit S of $2^n$ and a carry bit of $C^{n+1}$. That is, as shown in FIG. 3B, the bits A, B, and C are added, and the carry bit C0 and the sum bit S which have the same function as a full adder are outputted.

As a result, the function of the wallace tree having 3 input bits is the same as in a full adder, and the function of the wallace having 2 input bits has the same function as in a half adder, and the wallace tree corresponding to the remaining input bits includes a plurality of full adders and half adders.

In addition in case that a wallace tree includes $2^n$ input bits, N+1 bits are outputted, and the outputted bits have digits of $2^n$, $2^{n+1}$ ..... $2^0$.

Figure 4A:
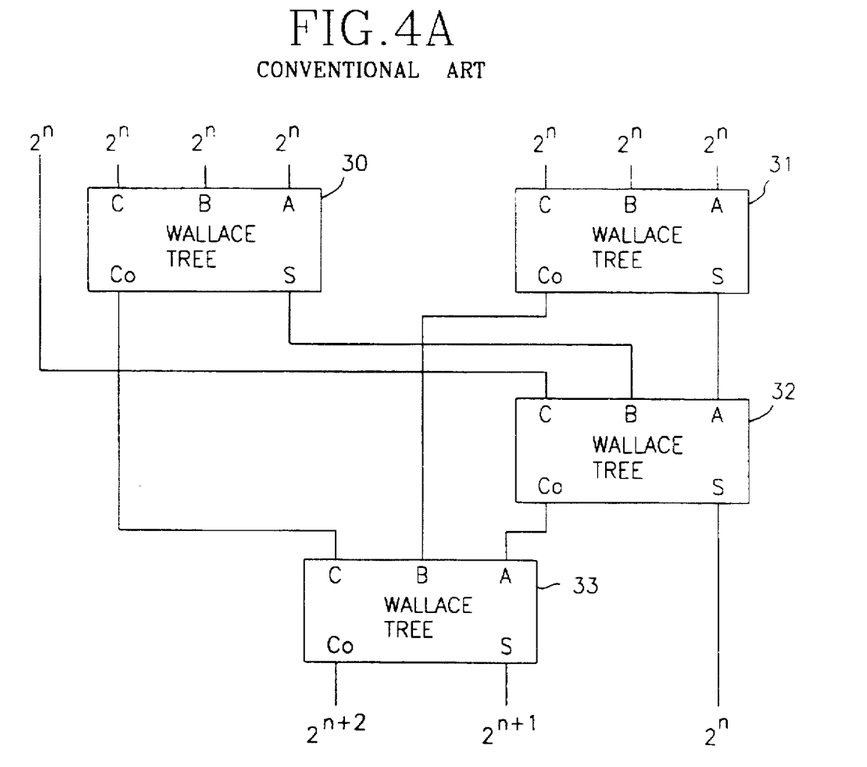
FIG. 4A is a block diagram of a full adder including a wallace tree including a 7 input bits in a conventional parallel multiplier.

The wallace tree requires additional full adders as the number of input increases. As shown in FIG. 4A, in case that a general wallace tree has 7 input bits, it includes a wallace tree 30 and a wallace tree 31 each receiving 3-bit of $2^n$ digit, a wallace tree 32 for receiving the sum bit S of the wallace tree 30 and the sum bit S of the wallace tree 31 and for outputting the sum bit S of $2^n$ digit, and a wallace tree 33 for receiving the carry bit C0 of the wallace tree 31 and the carry bit C0 of the wallace tree 30 and for outputting the sum bit S of $2^{n+1}$ digit and the carry bit C0 of $2^{n+2}$ digit.

Figure 4B:
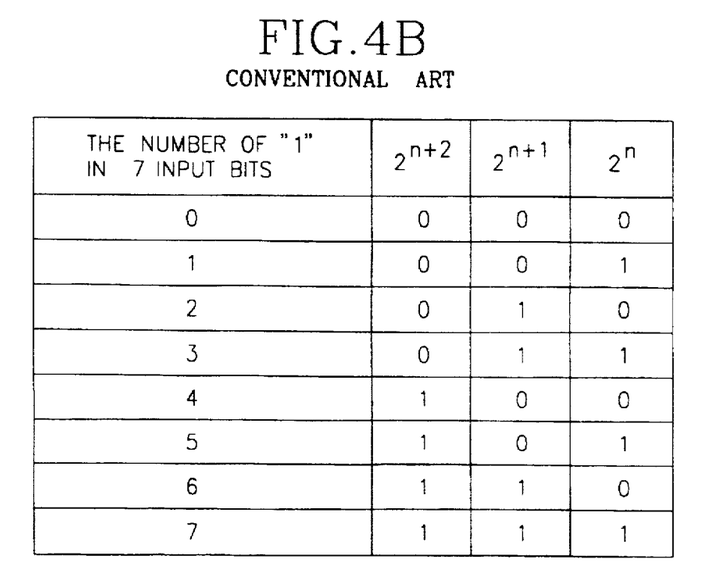
FIG. 4B is a truth table of a full adder including a wallace tree including a 7 input bits in a conventional parallel multiplier.

As shown in FIG. 4B, in the above-described wallace tree, the number of "1" among the 7 input bits can be expressed in binary digit, and sums the input bits having the same digit and outputs the sum. That is, the number contained in the input bits is the same as the sum of the input bits.

Figure 5:
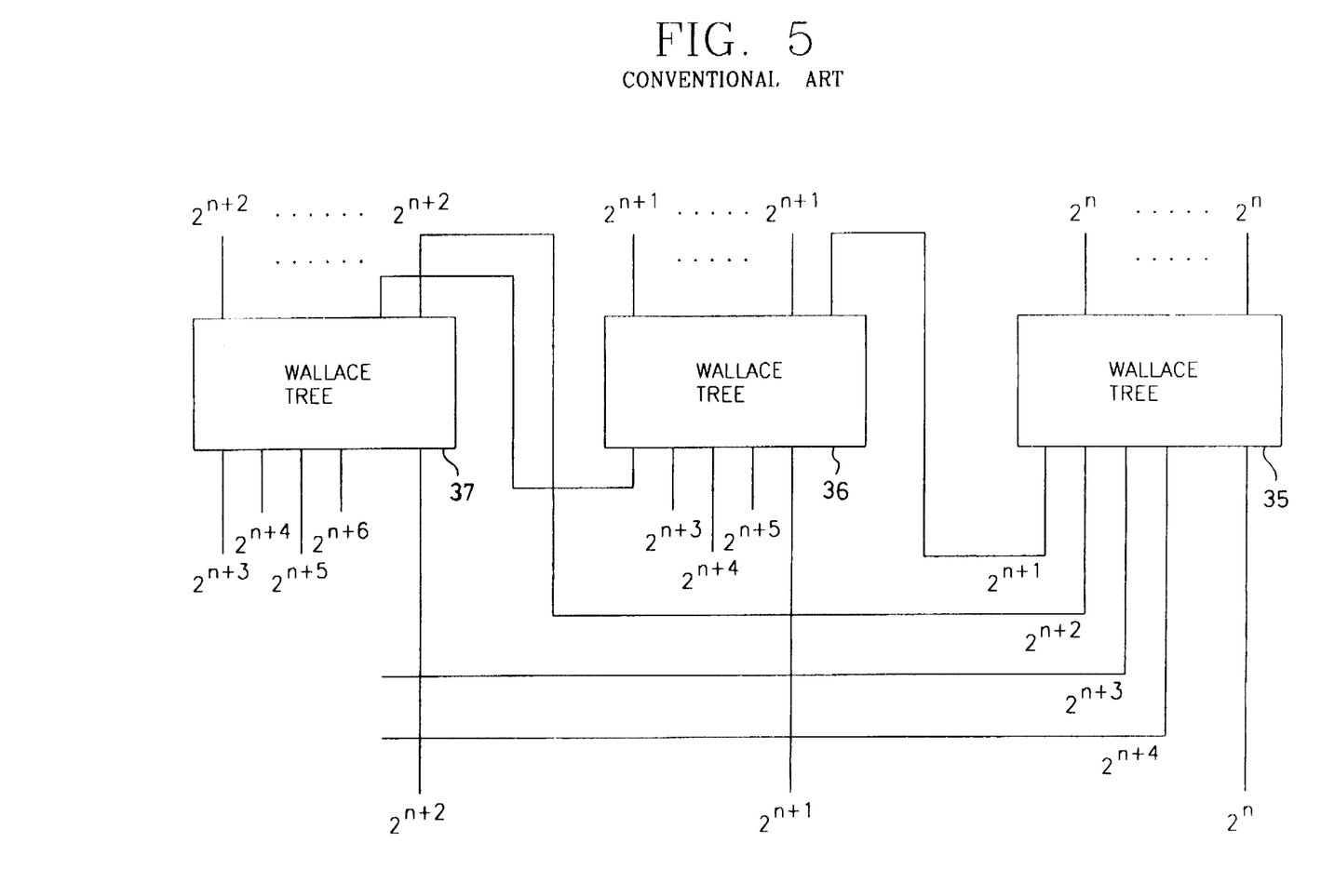
FIG. 5 is a block diagram of a construction of a plurality of a wallace tree having a 16 input bits in a conventional parallel multiplier.

FIG. 5 shows a construction sequentially connecting a plurality of wallace trees each having 16-bit input. That is, a wallace tree 35 receives a 16-bit of $2^n$ digit and outputs 5-bit of $2^{n+4}$, $2^{n+2}$, $2^{n+1}$, and $2^n$. Thereafter, a wallace tree 36 receives the 16-bit of $2^{n+1}$ having $2^{n+1}$ digit outputted from the wallace tree 35 and outputs 5-bit of $2^{n+5}$, $2^{n+4}$, $2^{n+3}$, and $2^{n+2}$, and $2^{n+1}$. In addition, a wallace tree 37 receives bits of $2^{n+2}$ outputted from the wallace tree 35 and 16-bit of $2^{n+2}$ including bits of $2^{n+1}$ outputted from the wallace tree 36 and outputs 5-bit of $2^{n+6}$, $2^{n+5}$, $2^{n+4}$ and $2^{n+3}$, and $2^{n+2}$.

If a plurality of wallace trees connected with one another in the above-described manner are used in an addition of a parallel multiplier, the speed of the addition can be increased and the operation speed of the parallel multiplier can be increased.

A parallel multiplier using a wallace tree can increase the operation speed more compared with a standard parallel multiplier, however it has different constructions from one another in accordance with the number of outputted carry bits. In addition, the parallel multiplier has much time delay due to the carry bits outputted from wallace trees. Moreover, in case that a multiplier bit and a multiplicand bit are "n" bits, respectively, the number of required transistors is in proportion to $n^2$ logn, so that the construction of required circuit becomes complicated, and it is hard to design the circuit, and thus the manufacturing cost increases.

SUMMARY OF THE INVENTION

Accordingly, it is an object of the present invention to provide a parallel multiplier, which overcome the problems encountered in a conventional parallel multiplier.

It is another object of the present invention to provide an improved parallel multiplier capable of operating an addition operation by connecting a plurality of dividers sequentially, thus providing more simple circuit and reducing operating time thereof.

To achieve the above objects, there is provided a parallel multiplier, which includes NXM AND-gates each for ANDing each multiplier bit ranging from a least significant bit to a most significant bit with each multiplicand bit in case of multiplying "N" multiplicand bits and "M" multiplier bits and for performing a partial multiplication and for outputting a least significant bit as a result of the multiplication; and a plurality of input-bits dividers, having 2-, 3-, and 4-input-bits dividers, for receiving an output bit of a corresponding location among a rearranged output bit and a quotient bit outputted from a proceeding input bit in case that the output bits of the AND-gates is shifted to the left by a bit in accordance with a conventional binary multiplication method and for outputting a quotient bit and a remaining bit corresponding to each bit of a multiplication result.

BRIEF DESCRIPTION OF THE DRAWINGS

FIGS. 6B and 6C are truth tables of a 4-input-bits divider adopted in a parallel multiplier according to the present invention.

DETAILED DESCRIPTION OF THE INVENTION

Figure 6A:
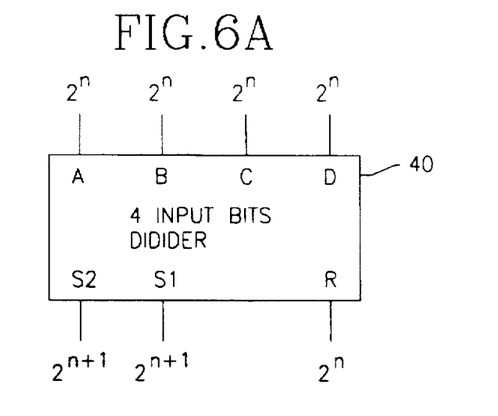
FIG. 6A is a block diagram of a 4-input-bits divider adopted in a parallel multiplier according to the present invention.
Figure 6B:
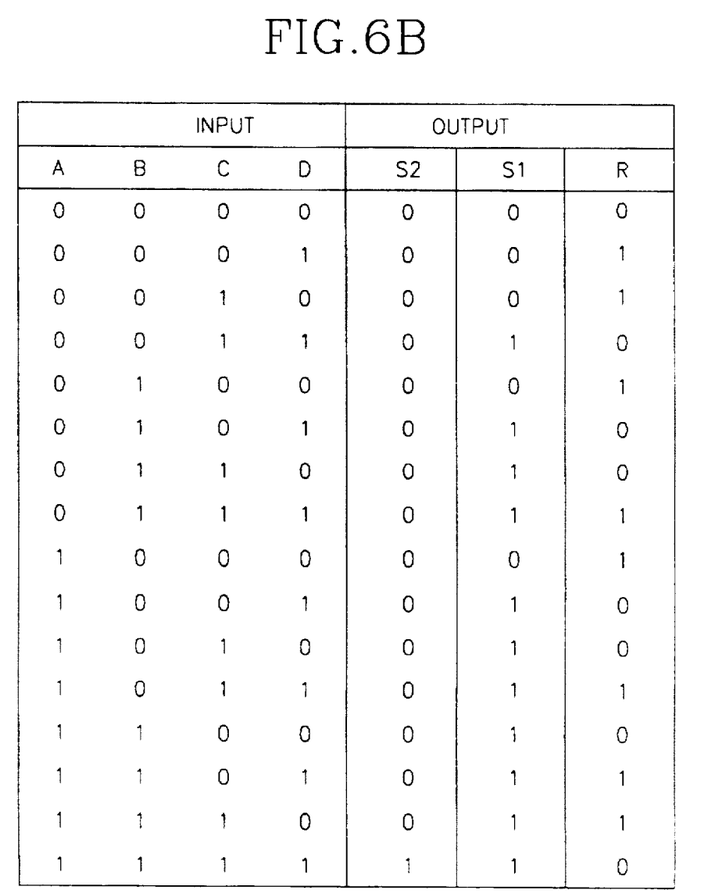
Figure 6C:
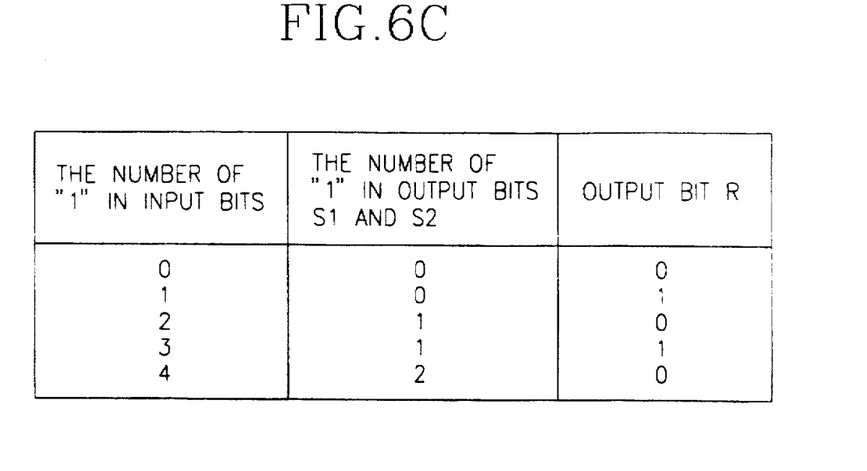
FIG. 6C is a table for describing the input/output characteristics of 4-input-bits divider adopted in a parallel multiplier according to the present invention.

Referring to FIG. 6A, a parallel multiplier according to the present invention includes a 4-input-bits divider 40 for receiving 4 bits A, B, C, and D of $2^n$ digit and for outputting a remaining bit R of $2^n$ and quotient bits S1 and S2 of $2^{n=1}$ digit. In this case, a truth table of the 4-input-bits divider 40 is shown in FIG. 6B. The 4-input-bits divider 40, as shown in FIG. 6C, outputs a predetermined number of "1" among the inputted 4 bits A, B, C, and D. The quotient obtained by dividing the number of "1" by two(2) is the same as the number of "1" bits included in the quotient bits S1 and S2. In addition, the remaining obtained by dividing the number of "1" by two(2) is the remaining bit R.

Figure 7:
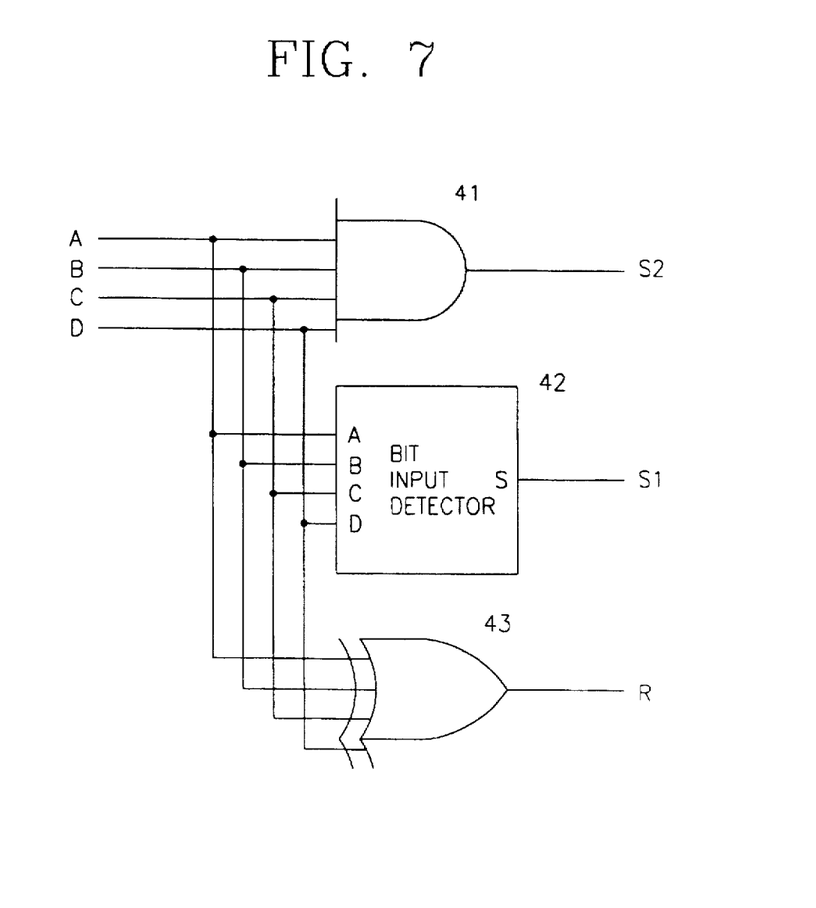
FIG. 7 is a circuit diagram of a 4-input-bits divider adopted in a parallel multiplier according to the present invention.

Here, as shown in FIG. 7, the 4-input-bits divider 40 includes an AND gate 41 for ANDing the 4 bits A, B, C, D and for outputting a bit S2, an input bit detector 42 for outputting a quotient bit S1 having "1" in case that the number of "1" among the 4 bits A, B, C, and D is two or more, and an exclusive OR-gate 43 for exclusively ORing the 4 bits A, B, C, and D and for outputting the remaining bit R.

Figure 8:
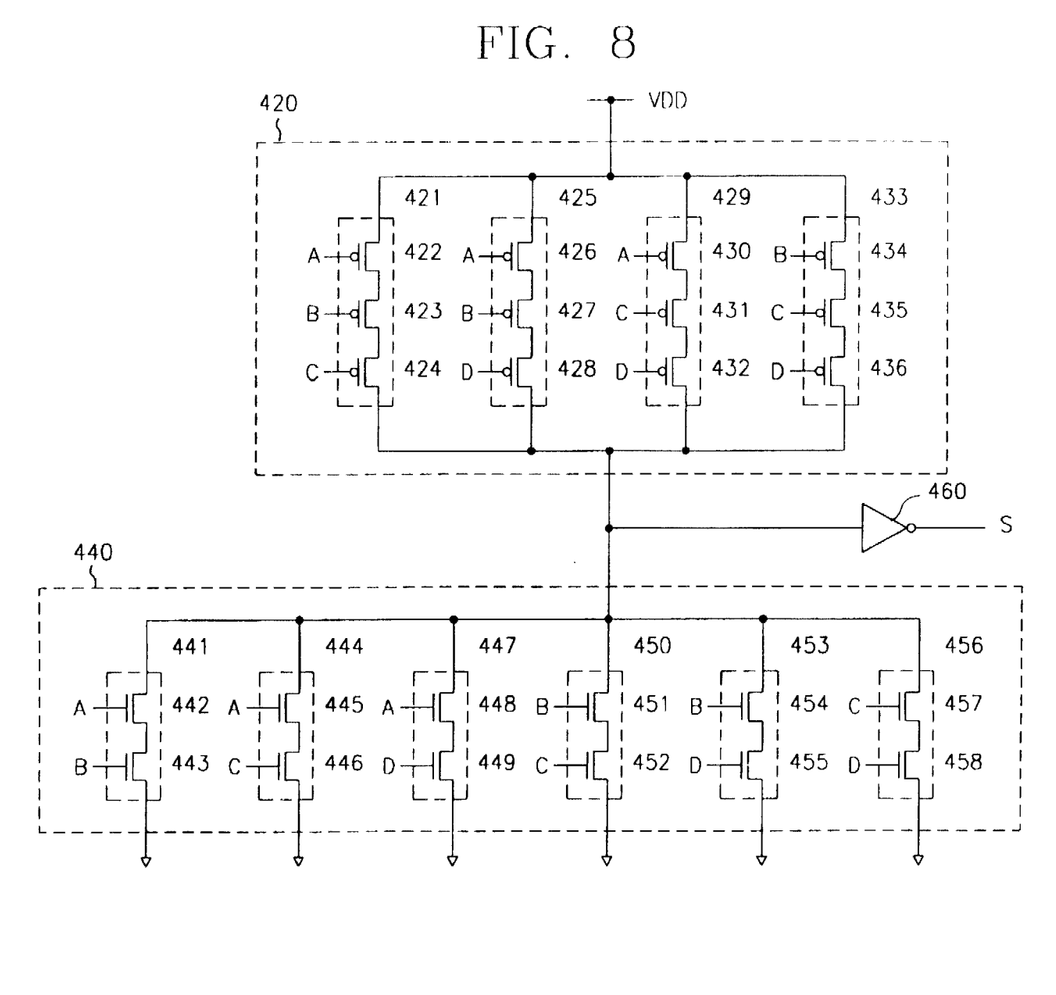
FIG. 8 is a circuit diagram of a bit input detector of FIG. 7.

In addition, the input bits detector 42, as shown in FIG. 8, a "0" bit detector 420 for receiving an electric power VDD, a "1" bit detector 440 in which one side is connected to the other side of the "0" bit detector 420 and the other side thereof is connected to ground, and an inverter 460 for inverting the bits of one side of the "1" bit detector 440 and the other side of the "0" bit, detector 420 and for outputting the bits S.

The "0" bit detector 420 includes PMOS units 421, 425, 429, and 433 in which one side thereof is connected to the electric power VDD and the other side thereof are commonly connected to the input terminal of the inverter 460 and the "1" bit detector 440. The "1" bit detector 440 includes NMOS units 441, 444, 447, 450, 453, and 456 in which one side thereof is commonly connected to the "0" bit detector 420 and the input terminal of the inverter 460, and the other side thereof is connected to ground.

The PMOS unit 421 includes a PMOS transistor 422 in which a gate receives an input bit A, a PMOS transistor 423 in which a gate receives an input bit B, and a PMOS transistor 424 in which a gate receives an input bit C. Here, the PMOS transistors 422, 423, and 424 are connected one another in series.

In addition, the PMOS unit 425 includes a PMOS transistor 426 in which a gate receives an input bit A, a PMOS transistor 427 in which a gate receives an input bit B, and a PMOS transistor 428 in which a gate receives an input bit D. Here, the PMOS transistors 426, 427, and 428 are connected one another in series.

In addition, the PMOS transistor 429 includes a PMOS transistor 430 in which a gate receives an input bit A, a PMOS transistor 431 in which a gate receives an input bit C, and a PMOS transistor 432 in which a gate receives an input bit D. Here, the PMOS transistors 430, 431, and 432 are connected one another in series.

In addition, the PMOS transistor 433 includes a PMOS transistor 434 in which a gate receives an input bit B, a PMOS transistor 435 in which a gate receives an input bit C, and a PMOS transistor 436 in which a gate receives an input bit D. Here, the PMOS transistors 434, 435, and 436 are connected one another in series.

Meanwhile, the NMOS transistor 441 includes an NMOS transistor 442 in which a gate receives an input bit A, and an NMOS transistor 443 in which a gate receives an input bit B. Here, the NMOS transistors 441 and 442 are connected in series each other.

In addition, the NMOS transistor 444 includes an NMOS transistor 445 in which a gate receives an input bit A, and an NMOS transistor 446 in which a gate receives an input bit C. Here, the NMOS transistors 445 and 446 are connected in series each other.

In addition, the NMOS transistor 447 includes an NMOS transistor 448 in which a gate receives an input bit A, and an NMOS transistor 449 in which a gate receives an input bit D. Here, the NMOS transistors 448 and 449 are connected in series each other.

In addition, the NMOS transistor 450 includes an NMOS transistor 451 in which a gate receives an input bit B, and an NMOS transistor 452 in which a gate receives an input bit C. Here, the NMOS transistors 451 and 452 are connected in series each other.

In addition, the NMOS transistor 453 includes an NMOS transistor 454 in which a gate receives an input bit B, and an NMOS transistor 455 in which a gate receives an input bit D. Here, the NMOS transistors 454 and 455 are connected in series each other.

In addition, the NMOS transistor 456 includes an NMOS transistor 457 in which a gate receives an input bit C, and an NMOS transistor 458 in which a gate receives an input bit D. Here, the NMOS transistors 457 and 458 are connected in series each other.

In the 4-input-bits divider 40, the NAND gate 41 NANDs the 4 bits A, B, C, and D each of $2^n$ digit and outputs the bits S2 of $2^{n+1}$, and the exclusive OR-gate 43 exclusively ORs the 4 bits A, B, C, and D of $2^n$ digit and outputs the remaining bit R of $2^{n+1}$.

In addition, the 4 bits A, B, C, and D of $2^n$ digit are inputted into the "0" bit detector 420 and the "1" bit detector 440.

Therefore, in case that more than three "0" bits are in the 4 bits A, B, C, and D, at least one PMOS transistor in each PMOS units 421, 425, and 433 is turned on, and "1" is inputted into the inverter 460, and the inverter 460 outputs the bit S having "0" bit.

In addition, in case that more that two "1" bits are in the 4 bits A, B, C, and D, at least one NMOS transistor in the NMOS units 441, 444, 447, 450, 453, and 456 is turned on, "0" is inputted into the inverter 460, and the inverter 460 outputs the bit S having "1" bit.

Here. The bit S outputted from the inverter 460 is the quotient bit S1 outputted from the 4-input-bits divider 40.

The 4-input-bits divider 40 outputs the quotient bit S1 having "1" bit when more than two "1" bits are inputted thereto. In addition, when all input bits have "1" bit, the 4-input-bits divider 40 outputs the quotient bit S1 and the quotient bit S2 each having "1" bit. Therefore, the number of "1" bit contained in the quotient bits S1 and S2 is the quotient obtained by dividing the number of "1" bit by two(2) which is inputted into the 4-input-bits divider 40.

Figure 9A:
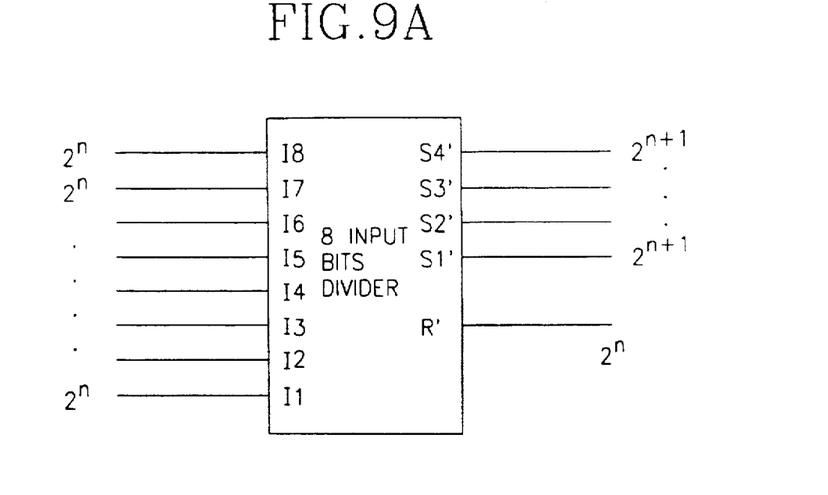
FIG. 9A is a block diagram of an 8-input-bits divider according to a first embodiment thereof in a parallel multiplier of the present invention.

It is possible to adopt various kinds of input-bits divider using the 4-input-bits divider 40 to make a parallel multiplier. Referring to FIG. 9A, the 8-input-bits divider 50 receives 8-bits I1 through I8 of $2^n$ digit and outputs the remaining bit R' of $2^n$ digit corresponding to the remaining number obtained by dividing the number of "1" by two(2) and the quotient bit of $2^{n+1}$ corresponding to the quotient bit obtained by dividing the number of "1" by two(2).

Figure 9B:
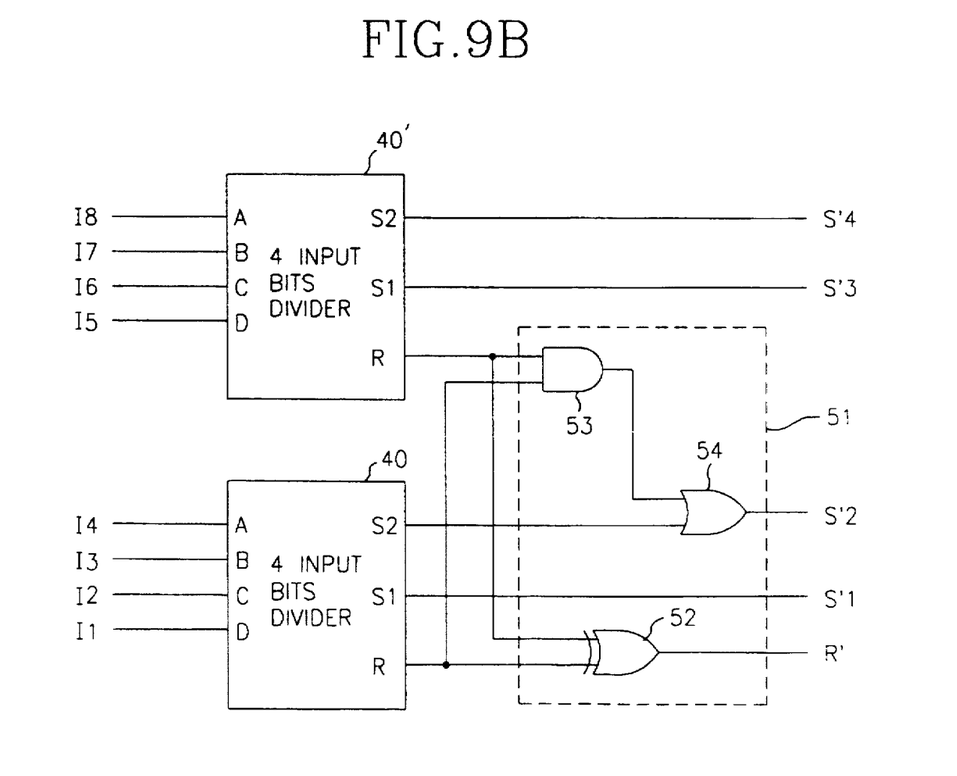
FIG. 9B is a circuit diagram of an 8-input-bits divider of a parallel multiplier according to the present invention.

That is, as shown in FIG. 9B, the 8-input-bits divider 50 includes a 4-input-bits divider 40 for outputting 4 bits I1 through I4, a 4-input-bits divider 40' for outputting 4 bits I5 through I8, and a logic operation unit 51 for logically operating the remaining bits R outputted from the 4-input-bit divider 40', the remaining bits R outputted from the 4-input-bits divider 40, and the quotient bit S2.

Here, the logic operation unit 51 includes an exclusive OR-gate 52 for exclusively ORing the remaining bits outputted from the 4-input-bits divider 40 and the 4-input-bits divider 40', respectively, and for outputting the remaining bits R, an NAND-gate 53 for NANDing the remaining bits R outputted from the 4-input-bits divider 40 and the 4-input-bits divider 40', and an OR-gate 54 for ORing the output bits of the NAND gate 53 and the quotient bits S2 outputted from the 4-input-bits divider 40.

In the above-described 8-input-bits divider 50, the 4-input-bits divider 40 and the 4-input-bits divider 40' outputs the bits R, S1, and S2, respectively. At this time, since all the remaining bits R respectively outputted from the 4-input-bits divider 40 and the 4-input-bits divider 40' may be "1" bit, a logic operation unit 51 is additionally necessary. Therefore, the NAND-gate 53 of the logic operation unit 51 NANDs the remaining bits R outputted from the 4-input-bits divider 40 and the 4-input-bits divider 40', respectively, and the OR-gate 54 ORs the quotient bits S2 outputted from the 4-input-bits divider 40 and the output bits outputted from the 51 and outputs the quotient bits S2' of $2^{n+1}$ digit.

In addition, the exclusive OR-gate 52 ORs the remaining bits R outputted from the 4-input-bits divider 40 and the 4-input-bits divider 40', respectively, and outputs the remaining bit R' of $2^n$.

In addition, all the quotient bit S1' corresponding to the quotient bit S1 of the 4-input-bits divider 40, the quotient bit S3' corresponding to the quotient bit S1 of the 4-input-bits divider 40' and the bit S4' corresponding to the quotient bit S2 of the 4-input-bits divider 40' are bits of $2^n$.

Figure 10:
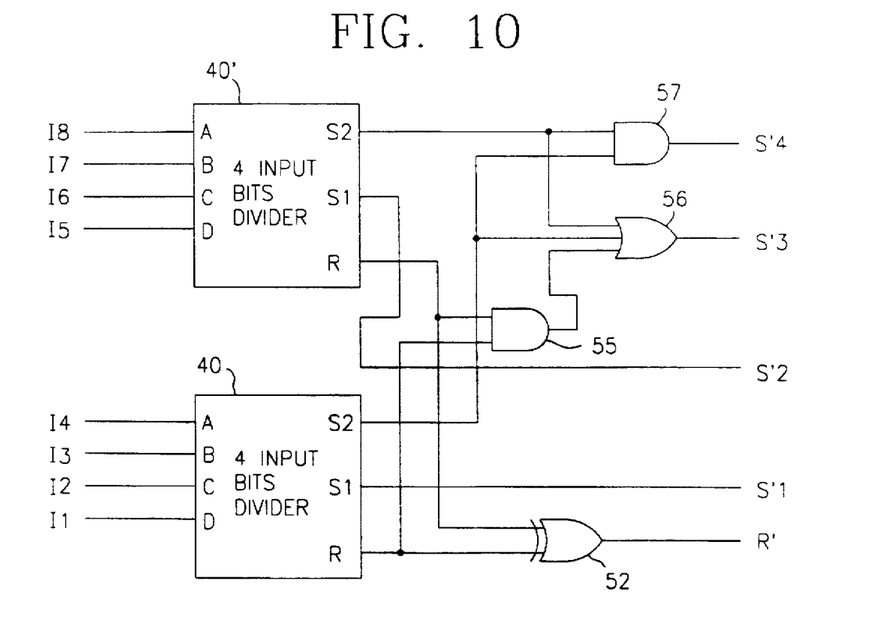
FIG. 10 is a circuit diagram of an 8-input-bits divider according to a second embodiment thereof in a parallel multiplier of the present invention.

Meanwhile, as shown in FIG. 10, another embodiment of the 8-input-bits divider 4-input-bits dividers 40 and 40' and an exclusive OR-gate 52, an AND-gate 55 for ORing the remaining bits R outputted from the 4-input-bits dividers 40 and 40', respectively, an OR-gate 56 for ORing the output bit of the AND-gate 55, and the quotient bits S2 of the 4-input-bits divider 40, and the quotient bits S2 of the 4-input-bits divider 40', and a AND-gate 57 for ANDing the quotient bits S2 of the 4-input-bits divider 40 and the quotient bits S2 of the 4-input-bits divider 40'.

Figure 11:
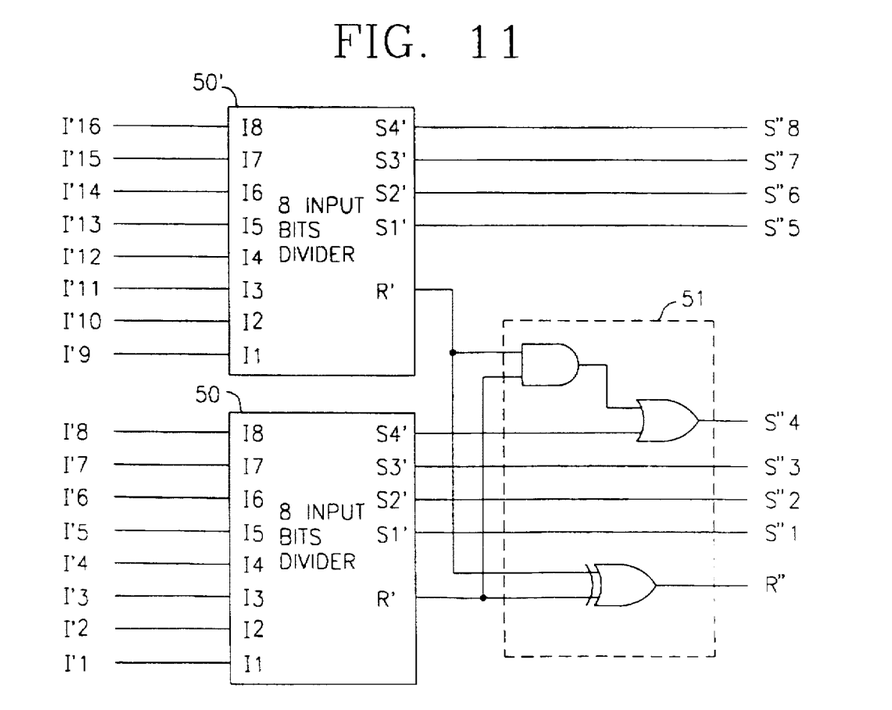
FIG. 11 is a circuit diagram of a 16-input-bits divider in a parallel multiplier according to the present invention.

Meanwhile, as shown in FIG. 11, a 16-input-bits divider includes 8-input-bits dividers 50 and 50' and a logic operation unit 51' for logically operating the output bits R' and S4 of the 8-input-bits dividers 50 and 50'.

Here, the 2-input-bits divider has the same function as in a half adder. In addition, the 3-input-bits divider has the same function as in a full adder. As mentioned above, various kinds of input-bits dividers can be possible by connecting 2- and 3-input-bits dividers and above-mentioned input-bits dividers as a logic operation unit.

Figure 12:
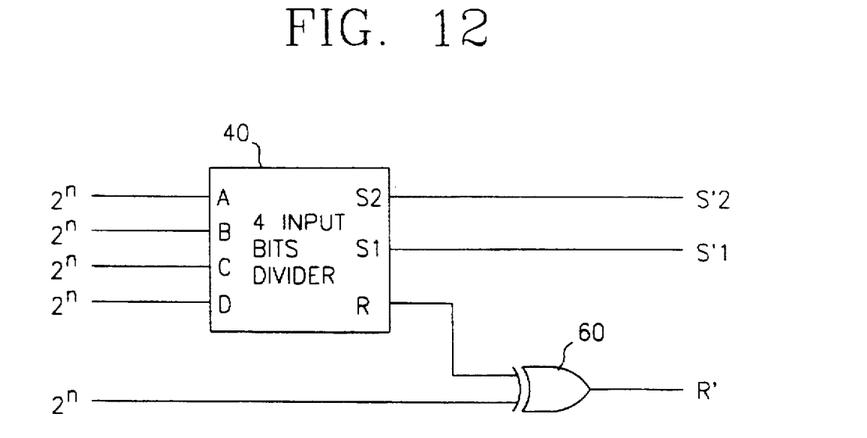
FIG. 12 is a circuit diagram of a 5-input-bits divider in a parallel multiplier according to the present invention.

That is, as shown in FIG. 12, a 5-input-bits divider includes a 4-input-bits divider 40, and an exclusive OR-gate 60 for exclusively ORing one bit among the remaining bit R of the 4-input-bits divider 40 and the 5 bits applied thereto.

Figure 13:
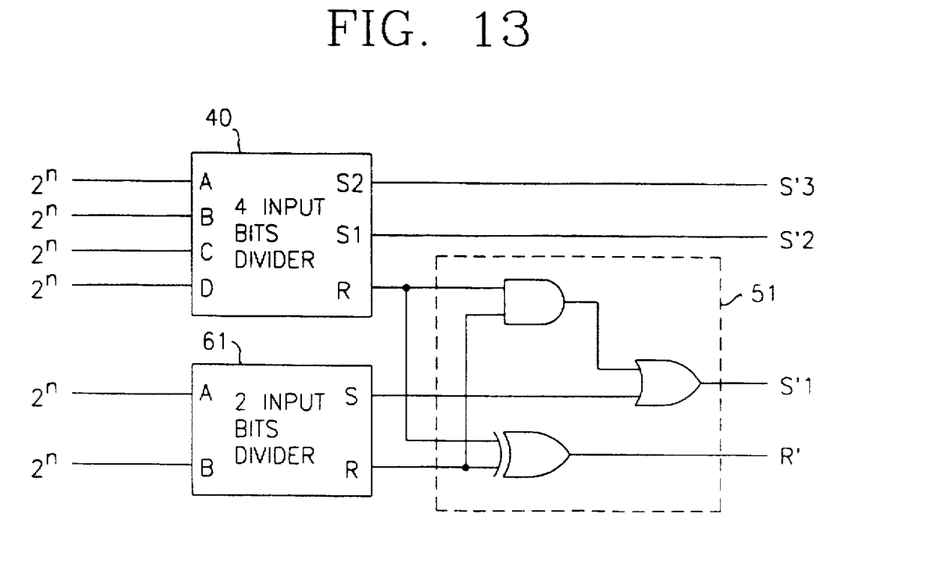
FIG. 13 is a circuit diagram of a 6-input-bits divider in a parallel multiplier according to the present invention.

In addition, as shown in FIG. 13, a 6-input-bits divider includes a 2-input-bits divider 61, a 4-input-bits divider 40, and a logic operation unit 51 for logically operating the output bits R of the 4-input-bits divider 40, and the output bits R and S of the 2-input-bits divider 61 in the above-mentioned manner.

Figure 14:
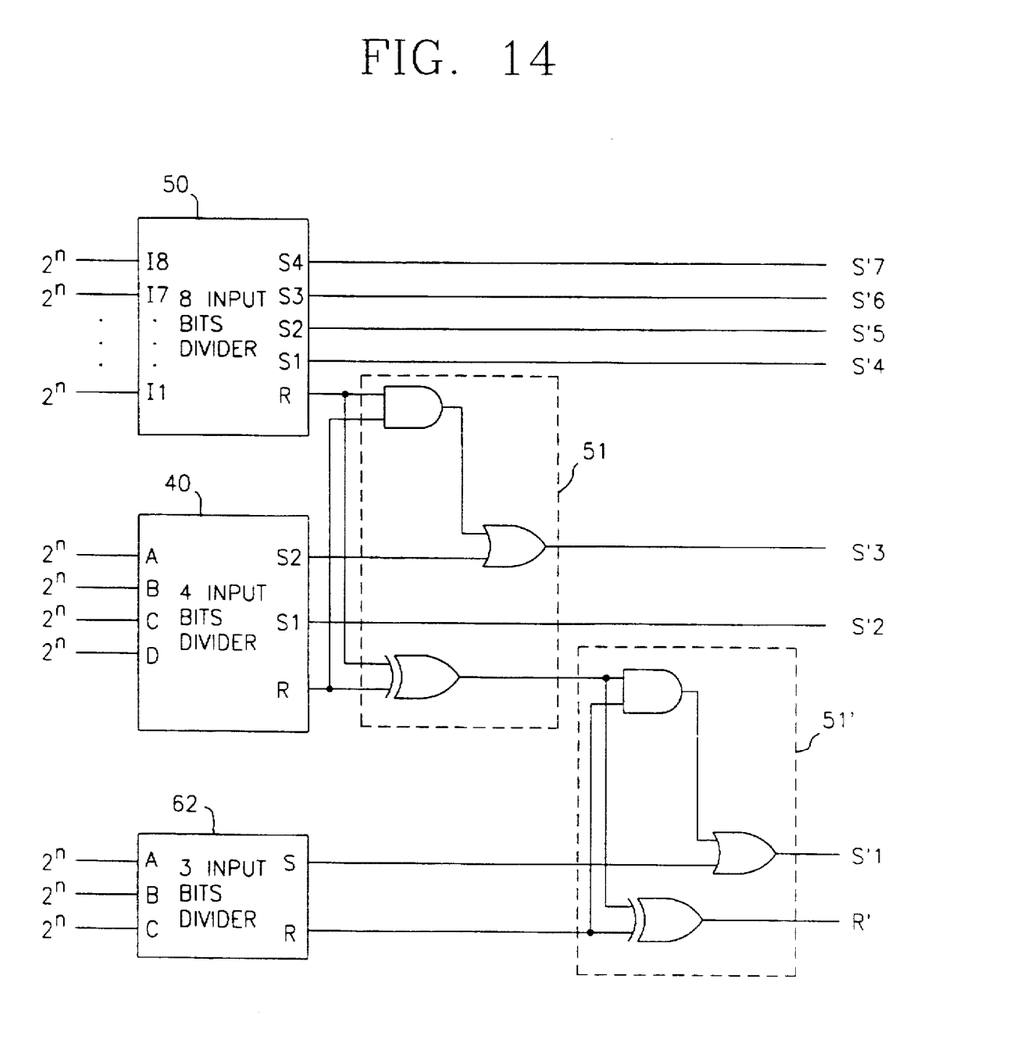
FIG. 14 is a circuit diagram of a 15-input-bits divider in a parallel multiplier according to the present invention.

Meanwhile, as shown in FIG. 14, a 15-input-bits divider includes a 3-input-bits divider 62, a 4-input-bits divider 40, an 8-input-bits divider 50, a logic operation unit 51 for logically operating the remaining bit R of the 8-input-bits divider 50 and the output bits R and S2 of the 4-input-bits divider 40, and a logic operation unit 51' for logically operating the output bits of the exclusive OR-gate of the logic operation unit 51 and the output bits R and S of the 3-input-bits divider 62.

Figure 15:
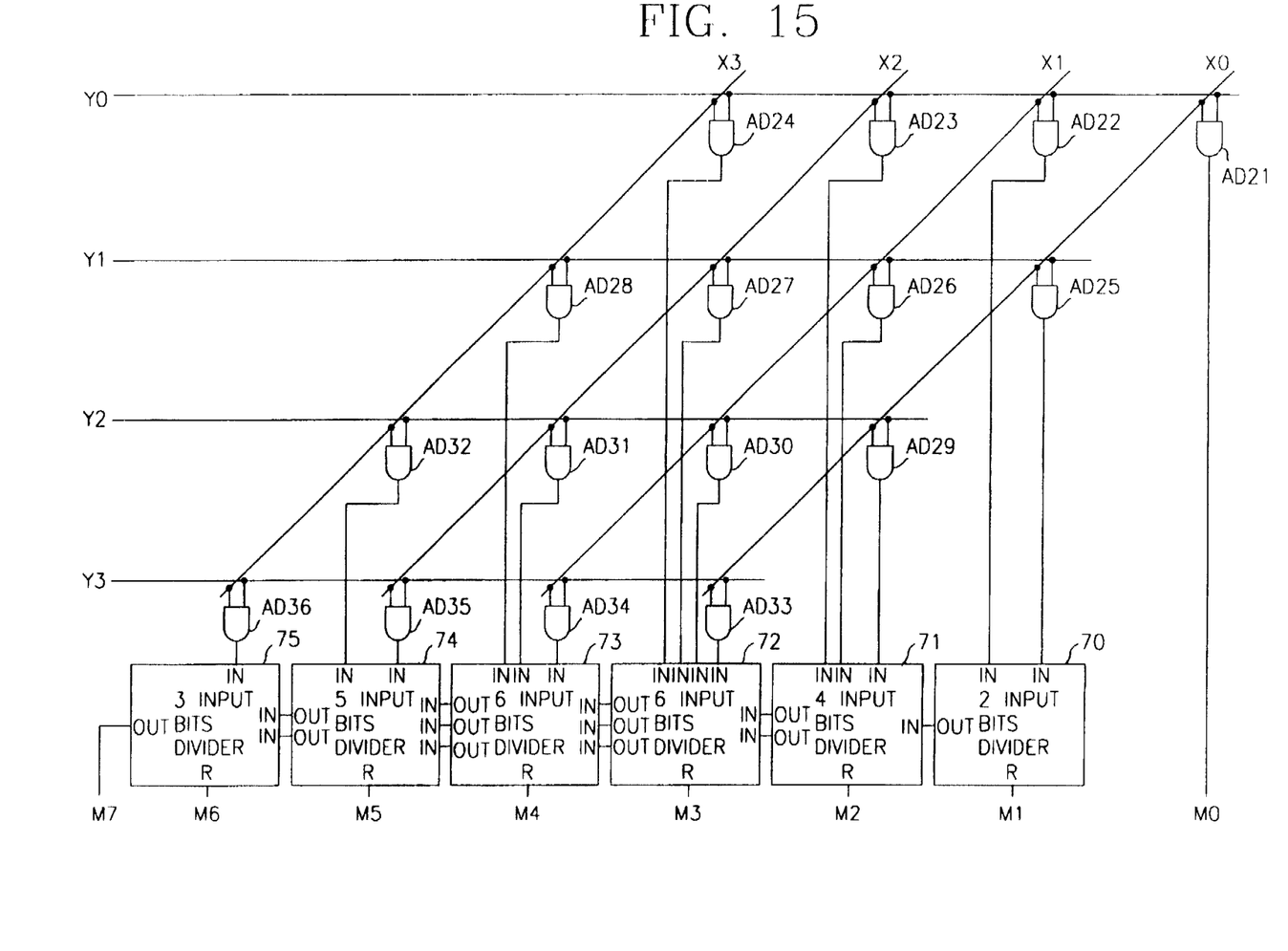
FIG. 15 is a circuit diagram of a parallel multiplier according to the present invention.

The parallel multiplier using above-described various kinds of input-bits dividers, as shown in FIG. 6, in case that multiplicand bits X0 through X3 and multiplier bits Y0 through Y3 are 4 bits, respectively, includes AND-gates AD21 through AD24 for ANDing a bit Y0 and its corresponding bits X0 through X3, AND-gates AD25 through AD28 for ANDing a bit Y1 and its corresponding bits X0 through X3, AND-gates AD29 through AD32 for ANDing a bit Y2 and its corresponding bits X0 through X3, AND-gates AD33 through AD36 for ANDing a bit Y3 and its corresponding bits AD22 through AD25, a 2-input-bits divider 70 for receiving the output bits outputted from the AND-gates AD22 and AD25 and for outputting a quotient bit OUT and a remaining bit R, a 4-input-bits divider 71 for receiving the quotient bit OUT outputted from the 2-input-bits divider 70 and the output bits outputted from the AND-gates AD23, AD26, and AD29 and for outputting two quotient bits OUT and the remaining bit R, a 6-input-bits divider 72 for receiving the quotient bits OUT outputted from the 4-input-bits divider 71 and the output bits outputted from the AND-gates AD24, AD27, AD30, and AD33 and for outputting three quotient bits OUT and a remaining bit R, a 6-input-bits divider 73 for receiving the quotient bits OUT outputted from the 6-input-bits divider 72 and the output bits outputted from the AND-gates AD28, AD31, and AD34 and for outputting three quotient bits OUT and a remaining bit R, a 5-input-bits divider 74 for receiving the quotient bits OUT outputted from the 6-input-bits divider 73 and the output bits outputted from the AND-gates AD32 and AD35 and for outputting two quotient bits OUT and a remaining bit R, and a 3-input-bits divider 75 for receiving the quotient bits OUT outputted from the 5-input-bits divider 74 and the output bits of the AND-gate AD36 and for outputting a quotient bit OUT and a remaining bit R.

As described above, the operation of the parallel multiplier according to the present invention will now be explained.

The parallel multiplier multiplies the multiplicand bits X0 through X3 and the multiplier bits Y0 through Y3 and outputs 8-bit M0 through M7, in which a least significant bit M0 is outputted from the AND-gate AD21.

Thereafter, the remaining bits R outputted from the 2-input-bits divider 70, the 4-input-bits divider 71, the 6-input-bits dividers 72 and 73, and the 5-input-bits divider 74 respectively corresponds to the bits M1 through M5. In addition, a remaining bit R outputted from the 3-input-bits divider 75 corresponds to a bit M6 and a quotient bit OUT corresponds to a most significant bit M7.

As described above, the parallel multiplier according to the present invention is directed to expressing the number of "1" inputted thereto as the quotient bit and the remaining bit by dividing the number of "1" by 2 using various kinds of input-bits dividers, thus increasing its operation speed and simplifying the construction of its circuit. Therefore, as the number of the multiplicand bits and the multiplier bits increase, the parallel multiplier according to the present invention can include the best chip performance with respect to its speed and surface, so that the parallel multiplier according to the present invention can be adopted in a high performance microprocessor, an operation apparatus, or a data processing apparatus.

What is claimed is:

1. A parallel multiplier comprising:

N×M AND-gates each for ANDing a multiplier bit ranging from a least significant bit to a most significant bit with a multiplicand bit and outputting an intermediate value when multiplying "N" multiplicand bits and "M" multiplier bits, wherein said N×M AND-gates perform a partial multiplication and output a least significant bit of a result of said multiplication; and a plurality of input-bits dividers, having 2-, 3-, and 4-input-bits dividers, wherein each of said plurality of input-bits dividers receives said intermediate value from at least one corresponding AND-gate of said N×M AND-gates and outputs a bit of said result between a least significant bit and a most significant bit of said result, wherein said each of said plurality of input-bits dividers outputs at least one quotient bit and exactly one remainder bit, wherein said plurality of remainder bits are said bits between said least significant bit and said most significant bit of said result.

2. The multiplier of claim 1, wherein said each of said plurality of input-bits dividers are coupled in series and divides a number of input bits by two (2) to output said at least one quotient bit, and one of said input-bits dividers outputs a most significant bit of said result.

3. The multiplier of claim 1, wherein each of said plurality of input-bits divider divides a number of "1" bits in said number of input bits by two to output said at least one quotient bit, and said division remainder as said remainder bit.

4. The multiplier of claim 1, wherein said 4-input-bits divider includes an input bit detector for detecting whether a number of "1" bits contained in four input bits is two or more and for outputting a first quotient bit;

an AND-gate for ANDing said four input bits and for outputting a second quotient bit; and an exclusive OR-gate for exclusively ORing said four input bits and for outputting said remainder bit.

5. The multiplier of claim 4, wherein said input bit detector includes:

"0" detector, with a first side connected to an electric power source, for detecting whether the number of "0" bits contained in said four input bits is more than two;

"1" detector, with a second side connected to a second side of said "0" detector, and a first side of said "1" detector is connected to a ground, for detecting whether the number of "1" bits contained in said four input bits is more than one; and an inverter having its input terminal commonly connected to the second side of the "0" detector and said second side of said "1" detector.

6. The multiplier of claim 5, wherein said "0" detector includes serially connected PMOS transistors, wherein at least one of said serially connected PMOS transistors is turned on when the number of "0" contained in said four input bits is more than two.

7. The multiplier of claim 5, wherein said "1" detector includes pairs of NMOS transistors, at least one of which is turned on when the number of "1" contained in input bits is more than one.

8. The multiplier of claim 1, wherein a 5-input-bits divider in said input-bits dividers includes:

said 4-input-bits divider; and an exclusive OR-gate for exclusively ORing said remainder bit outputted from said 4-input-bits divider and a fifth input bit to output a 5-input-bits divider remainder bit.

9. The multiplier of claim 1, wherein an input-bits divider having at least six input bits includes:

a 2-input-bits divider having the same function as a half adder that outputs a first remaining bit;

a 3-input-bits divider having the same function as a full adder that outputs a second remaining bit; and a logic operation unit coupling said input-bits dividers to output a desired quotient bit and a desired remaining bit.

10. The multiplier of claim 9, wherein said logic operation unit includes:

an exclusive OR-gate for exclusively ORing the first and second remainder bits outputted from two input-bits dividers and for outputting said desired remaining bit;

an AND gate for ANDing said first and second remainder bits respectively outputted from said input-bits dividers; and an OR-gate for ORing a quotient bit outputted from one of said input-bits dividers and the output of the AND-gate.

11. The multiplier of claim 9, wherein an 8-input-bits divider having 8 input bits among said input-bits dividers includes:

a pair of 4-input-bits divider; and a logic operation unit for outputting said desired remaining bit and said desired quotient bit of said 8-input bits divider by connecting said pair of 4-input-bits dividers.

12. The multiplier of claim 9, wherein an 8-input-bits divider having 8 input bits among said input-bits dividers includes:

a pair of 4-input-bits dividers;

an exclusive OR-gate for exclusively ORing remainder bits outputted from said 4-input-bits dividers and to output said desired remaining bit of said 8-input-bits divider;

a first AND-gate for ANDing the remainder bits outputted from said 4-input-bits dividers;

an OR-gate for ORing second quotient bits outputted from said pair of 4-input-bits dividers with the output of said first AND-gate; and a second AND-gate for ANDing the second quotient bits to output a predetermined quotient bit.

13. The multiplier of claim 9, wherein a 16-input-bits divider among said input-bits dividers includes:

a pair of 8-input-bits dividers; and a logic operation unit for determining said desired remaining bit of said 16-input-bits divider and said desired quotient bit by connecting said pair of 8-input-bits dividers.

14. The multiplier of claim 9, wherein a 15-input-bits divider among said input-bits dividers includes:

a 3-input-bits divider;

a 4-input-bits divider;

an 8-input-bits divider;

a first logic operation unit for outputting a first desired quotient bit and an intermediate remainder bit by connecting said 8-input-bits divider and said 4-input-bits divider; and a second logic operation unit for outputting a second desired quotient bit and said desired remaining bit of said 15-input-bits divider by logically connecting the intermediate remaining bit outputted from said first logic operation unit and the output bits of the 3-input-bits divider.

15. A parallel multiplier comprising:

N×M logic-gates, each of said N×M logic-gates performing a logical operation on a multiplier bit ranging from a least significant bit to a most significant bit with a multiplicand bit to output an intermediate value when multiplying "N" multiplicand bits and "M" multiplier bits; and a plurality of input-bits dividers, wherein each of said plurality of input-bits dividers receives said intermediate value from at least one corresponding logic-gate of said N×M logic-gates and outputs a bit of said result between a least significant bit and a most significant bit of said result, wherein said each of said plurality of input-bits dividers outputs at least one quotient bit and exactly one remainder bit, wherein said plurality of remainder bits are said bits between said least significant bit and said most significant bit of said result.

16. The parallel multiplier of claim 15, wherein said plurality of input-bits dividers are in order from a first input-bits divider to a last input-bits divider, and wherein said each of said plurality of input-bits dividers exclusive of said first input-bits divider further receives said at least one quotient bit from a preceding input-bits divider, and wherein said quotient bit of said last input-bits divider is the most significant bit of said result, and wherein said least significant bit of a result is output by one of said N×M logic-gates.

17. The parallel multiplier of claim 15, wherein said input-bits divider performs a dividing function on said intermediate value to determine said at least one quotient bit and said remainder bit.

18. The parallel multiplier of claim 17, wherein said input-bits dividers divide a number of "1" bits among a number of input bits to output said at least one quotient bit.

19. The parallel multiplier of claim 17, wherein said input-bits dividers divide a number of "1" bits among a number of input bits to output a remainder of the division operation as said exactly one remainder bit.

* * * * *